(12) United States Patent
Yin

(10) Patent No.: US 7,975,136 B1
(45) Date of Patent: Jul. 5, 2011

(54) HARDWARE-INDEPENDENT DETECTION OF SAN LOGICAL VOLUMES

(75) Inventor: Liang Yin, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1133 days.

(21) Appl. No.: 11/692,658

(22) Filed: Mar. 28, 2007

(51) Int. Cl.
*G06F 15/177* (2006.01)
(52) U.S. Cl. ............................ 713/2; 713/100
(58) Field of Classification Search ............... 713/2, 100
See application file for complete search history.

(56) References Cited

U.S. PATENT DOCUMENTS

| | | | | |
|---|---|---|---|---|
| 7,305,539 B2 * | 12/2007 | Br in et al. | ..................... | 711/173 |
| 7,496,745 B1 * | 2/2009 | Lok et al. | ........................... | 713/2 |
| 7,499,988 B2 * | 3/2009 | Keohane et al. | .............. | 709/221 |

OTHER PUBLICATIONS

Matt Brisse, et al., "Understanding Boot-From-SAN Technology," Dell White Paper, Sep. 2005, pp. 1-8.
Wikipedia, "GUID Partition Table," http://en.wikipedia.org/w/index.php?title=GUID_Partition_Table&printable=yes, Dec. 26, 2006, pp. 1-3.
QLogic, "QLogic Fibre Channel Driver for Kernel 2.6.x," Copyright 2006, pp. 1-15.
QLogic, "Technical White Paper iSCSI Boot," Nov. 11, 2004, pp. 1-12.
Hans Schramm, "Storage Networking Solutions (SNS) Europe," http://www.snseurope.com/snslink/news/printer-friendly.php?newsid=4357, Jun. 1, 2006, pp. 1-12.
Matthew Brisse, et al., "Architectural Implementation of a Boot-from SAN Manager," Dell Power Solutions, Feb. 2006, pp. 70-72.
Matthew Brisse and Ahmad Tawil, "Streamlining Server Management with Boot-from SAN Implementations," Dell Power Solutions, Aug. 2005, pp. 83-87.
Wikipedia, "Extensible Firmware Interface," http://en.wikipedia.org/w/index.php?title=Extensible_Firmware_Interface&printable=yes, Jan. 20, 2007, pp. 1-5.

* cited by examiner

*Primary Examiner* — Albert Wang
(74) *Attorney, Agent, or Firm* — Meyertons, Hood, Kivlin, Kowert & Goetzel, P.C.; Dean M. Munyon

(57) ABSTRACT

A system and method for determining a designated boot volume of a computer system coupled to a SAN is disclosed. The computer system is configured to boot from a logical volume on the SAN using a corresponding bus interface. One or more logical volumes within the SAN are identified and have code written to them. The code is executable to determine whether or not the computer system is configured to boot from that logical volume and to determine configuration information stored on the identified logical volumes.

20 Claims, 7 Drawing Sheets

HARDWARE-INDEPENDENT DETECTION OF SAN LOGICAL VOLUMES

BACKGROUND OF THE INVENTION

1. Field of the Invention

This invention relates to the field of information processing systems and, more particularly, to detecting logical volumes on a storage area network (SAN).

2. Description of the Related Art

A storage area network (SAN) may be implemented using a variety of components and configurations, including one or more logical storage volumes. Each "host" or "client" computer system connected to a SAN may interface to these logical volumes via one or more bus interfaces. A client system may be "booted" from the SAN by accessing a "bootable" logical volume in the SAN via a corresponding bus interface coupled to the client. This bus interface may be referred to as a "host-bus adapter" or HBA. The task of identifying and keeping track of which logical volumes within a SAN are bootable or selected for booting introduces additional complexity to the task of managing/configuring a SAN.

SUMMARY

Various embodiments of systems, methods, and computer-readable memory media storing program instructions are disclosed for managing bootable volumes on a storage area network (SAN) that is coupled to a computer system via one or more bus interfaces.

In one embodiment, a computer-readable memory medium stores program instructions that are computer-executable to cause the computer system to boot, identify one or more logical volumes within said SAN, and write code to the identified logical volumes, including a first logical volume. In this embodiment, the code written to said identified logical volumes is executable to determine whether or not said computer system is configured to boot from said first logical volume.

In some embodiments, said program instructions on the computer-readable medium and said code written to said identified logical volumes are executable to determine configuration information stored on said identified logical volumes. The configuration information for the first logical volume may include partition information relating to partitioning of said first logical volume. The partition information for the first logical volume may include data stored in the master boot record of the first logical volume, or may include at least a portion of a partition table stored on the first logical volume. The configuration information for each of said identified logical volumes may further indicate whether that logical volume is a bootable logical volume. If the configuration information indicates that said first logical volume is a bootable logical volume, the configuration information for said first logical volume may further indicate a type of operating system to be loaded upon booting from said first logical volume.

In some embodiments, the program instructions are further executable to write a different signature to each of said identified logical volumes, and store information indicative of the written signature for each of said identified logical volumes.

In various embodiments, the program instructions are executable, prior to writing code to the identified logical volumes, to read configuration information from each of said identified logical volumes, and to store the configuration information read from each of said identified logical volumes.

In still further embodiments, the program instructions are executable to cause said computer system to re-boot, wherein the computer system is configured to boot from a designated boot volume, and wherein, upon booting, said computer system is configured to execute the code previously written to the designated boot volume. The code written to the designated boot volume is executable to: read the signature stored on the designated boot volume; compare the signature with stored information indicative of the written signature for each of said identified logical volumes; and if the signature matches the stored information for the first logical volume, determine that the designated boot volume is the first logical volume. In some embodiments, the code written to the designated boot volume is further executable to: retrieve the stored configuration information for the first logical volume using the signature for the first logical volume; and write at least a portion of the retrieved configuration information to said first logical volume.

In yet a further embodiment, the program instructions are executable to determine, from the configuration information read from each of said identified logical volumes, which of the one or more of said identified logical volumes is configured as a bootable logical volume. A list of the bootable logical volumes may also be displayed. The program instructions may still further be executable to allow selection of one of the displayed list of the bootable logical volumes; and cause said computer to re-boot from the selected bootable logical volume. The program instructions may be further executable to configure said computer system to boot from the selected bootable logical volume.

Further embodiments include corresponding computer systems and methods.

Figure 1:
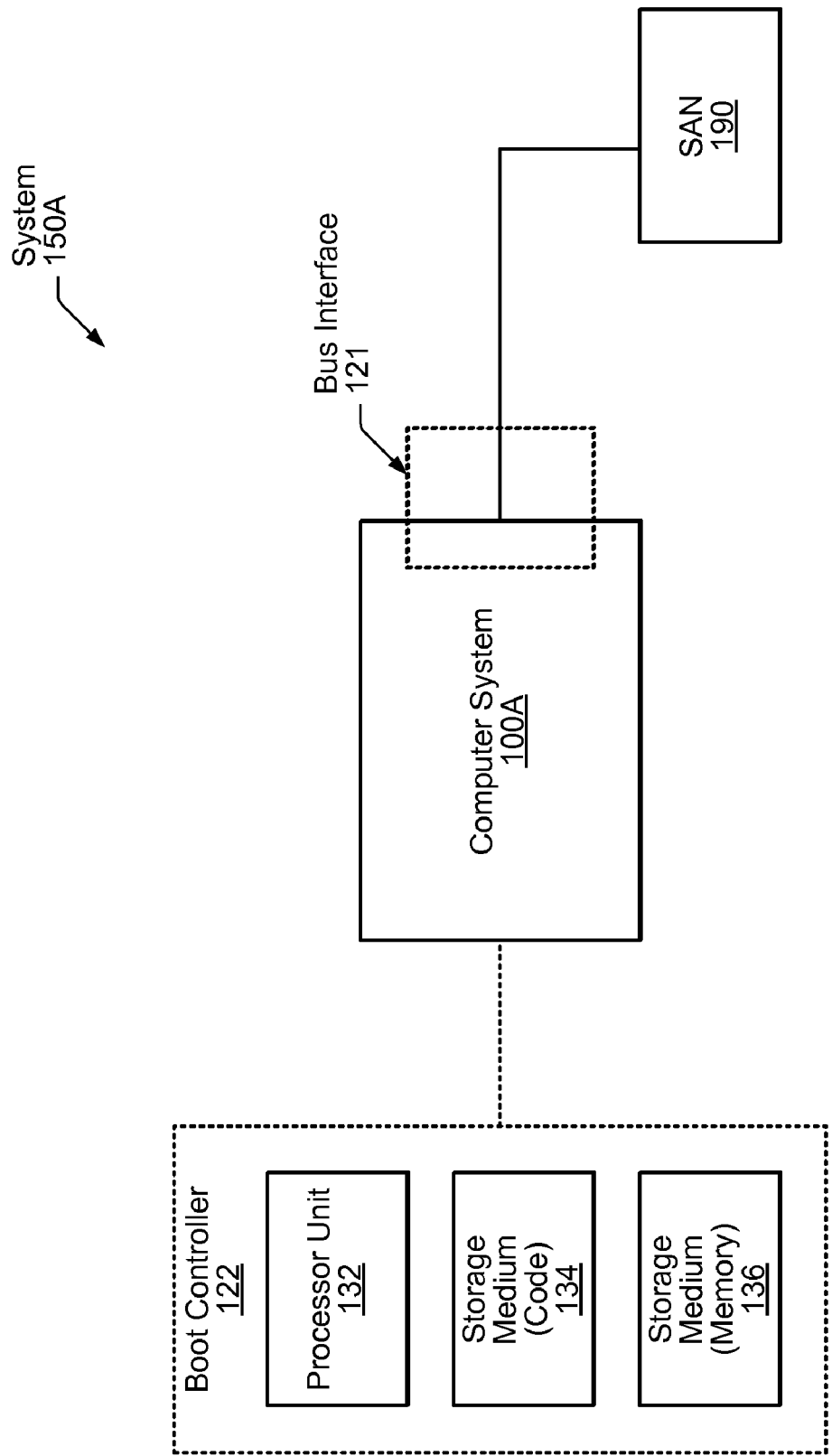
FIG. 1 is a block diagram of one embodiment of a system including a boot controller and a storage area network (SAN).

Specific embodiments are shown by way of example in the drawings and are herein described in detail. It should be understood, however, that the claims are not intended to be limited to only the specific embodiments shown in the drawings and described in the detailed description.

DETAILED DESCRIPTION

Referring to FIG. 1, a block diagram of one embodiment of a system 150A is illustrated. As will be described further herein, various embodiments of system 150A are possible. As shown, system 150A includes a computer system 100A that is coupled to a storage area network (SAN) 190 via a bus interface 121. System 150A also includes a boot controller 122. Boot controller 122 is shown in FIG. 1 as surrounded by a dotted line, indicating that is a "logical" representation of this element. Similarly, bus interface 121 also represents a logical embodiment in FIG. 1. As described below, boot controller 122 may be implemented in several different physical locations within system 150A.

Computer system 100A is representative of any of various types of computer systems, including form factors such as a workstation, a server, a blade server, a multiprocessor system, etc. Computer system 100A is internally configured to boot from a so-called "designated boot volume." This designated boot volume may be a storage device that is locally or remotely connected to computer system 100A.

In FIG. 1, element 190 represents the components and interfaces of a SAN, including the storage arrays and the so-called "SAN Fabric," as will be described in detail with reference to FIG. 2. Storage arrays are storage devices providing physical storage, which can be accessed as a "storage volume." A storage volume may be configured with a file system, which allocates and organizes the contents of the storage volume. One kind of storage volume on the SAN 190 is referred to as a "logical volume," which is a logical storage entity configured for access by one or more computer systems coupled to SAN 190. A logical volume may be physically located across one or more storage devices or storage arrays, but is logically accessed as a single storage space. For example, one or more RAID (Redundant Arrays of Inexpensive Disks) may provide the physical storage for a "logical volume" on the SAN 190

Computer 100A also includes one or more bus interfaces (logically shown as bus interface 121 in FIG. 1). Bus interface 121 connects an internal bus in computer 100A to an external bus interface, or other transport medium, of SAN 190. In one embodiment, bus interface 121 is a "host bus adapter" in the form of a peripheral device coupled to computer system 100A.

In various embodiments, bus interface 121 also includes functionality for configuring (or accessing) logical volumes on the SAN 190. For example, bus adapter 121 may include interface logic, memory and executable code for managing the physical and logical interfaces to SAN 190. In one embodiment, bus interface 121 includes its own BIOS firmware for managing (i.e., configuring and accessing) logical volumes, which includes designating a boot volume on SAN 190 for booting computer system 100A.

Accordingly, computer system 100A may be configured to boot from a logical volume configured on SAN 190. Such an architecture may be referred to as a "boot-from-SAN" architecture. In a boot-from-SAN implementation of system 150A, one or more logical volumes on SAN 190 are configured to be "bootable" and may thus be referred to as "bootable logical volumes."

At a given time, one of these bootable logical volumes is a designated boot volume, meaning this is the volume from which computer system 100A is internally configured to currently boot from. Since more than one logical volume present on SAN 190A may be bootable logical volumes, the internal configuration of the designated boot volume in computer system 100A can be changed.

In various embodiments, computer system 100A is internally configured in a boot-from-SAN architecture using embedded executable code. For example, BIOS firmware in computer system 100A may be used to specify a designated boot volume. The BIOS may also allow specifying a peripheral device to handle booting, such as bus interface 121. In turn, bus interface 121 includes its own firmware configurable to specify a logical volume on SAN 190 as the designated boot volume for computer system 100A. In an actual boot-from-SAN process in such a configuration, the computer system 100A BIOS passes boot control to bus interface 121 (e.g., a host bus adapter), which then initiates booting from the designated boot volume.

As server-side computing applications become larger and serve an increasing number of clients/users, the down time required to replace the physical hardware represents an increasingly substantial economic loss. A boot-from-SAN implementation can provide many advantages for high-density network server farms, including increased availability of computing applications that run on those servers. The down time resulting from hardware failures is reduced due to decreased time and complexity of the boot system configuration. In a boot-from-SAN system, a network server is configured to access and boot from a particular SAN logical volume. Thus, the need to re-install and re-configure an operating system, or any OS-dependent features, is eliminated, because the entire boot system is preserved on the SAN logical volume. In case of a hardware failure, a boot-from-SAN network server can thus be quickly and easily replaced and requires minimal reconfiguration.

As long as the designated boot volume is actually a bootable logical volume, the boot-from-SAN architecture is operational. However, if the designated boot volume is corrupted, or has been changed or reconfigured, the boot-from-SAN process may cause computer system 100A to stop, i.e. hang, during booting. Also, if some hardware component of computer system 100A is replaced, the original boot-from-SAN configuration could be lost. In such situations, the methods described herein provide a hardware-independent solution for determining which logical volume was the designated boot volume, and optionally, the internal configuration of any one or more of the logical volumes present on computer system 100A.

Bus interface 121 is further capable of providing different types of device interfaces for connection to computer system 100A. A variety of interfaces, such as for SCSI, iSCSI, SAS, SATA, USB, Firewire (IEEE-1394), and/or Fibre Channel devices are contemplated for use with bus interface 121. In various embodiments, the device interfaces are implemented using one or more host-bus adapters (HBAs) equipped with the corresponding electronic interface circuitry. For example, Fibre Channel HBAs are well known in the art for providing SAN interfaces to peripheral buses for common computer system architectures.

System 150A also includes boot controller 122, which is shown using a dotted line, representing the fact that in various embodiments, the components of boot controller 122 can be located wholly internal, partially internal, or wholly external to computer system 100A. As will be described in detail below, processor unit 132 of boot controller 122 executes code stored in a storage medium 134. The execution of code in storage medium 134 by processor unit 132 includes reading and/or writing data from/to a storage medium 136. In one embodiment, boot controller 122 is configured to control booting of computer system 100A via one or more logical volumes within SAN 190. As will be described below, boot controller 122 may also be used to manage access to logical volumes within SAN 190.

Processor unit 132 represents one or more processors or processor subsystem, and can be any type of suitable processor architecture. In one embodiment, processor unit 132 is located within computer system 100A. For example, in such an embodiment, processor unit 132 can be the primary processor or processors used to control computer system 100A. In another embodiment, processor unit 132 is partially or wholly external to computer system 100A. For example, processor unit 132 may be coupled to computer system 100A via a network connection. The network connection may be any kind of a wired or wireless network: client-server network, LAN, WAN, mesh network, etc. Thus, element 132 shown in FIG. 1 is representative of one or more processors (or processor subsystems) that execute code located in storage medium 134.

Storage medium 134 stores program instructions (e.g., code) that are executable by processor unit 132. These instructions include, in one embodiment, instructions in compiled form, for example, assembly code for a given target processor subsystem. In another embodiment, instructions within medium 134 are in interpretable form. In various embodiments, program instructions include source code or executable code. The program instructions may further include (or be associated with) an execution environment for executing code on one or more target platforms. Thus, "program instructions," as used herein and in the appended claims, has a broad meaning.

As with processor unit 132, storage medium 134 is not limited to a particular location with system 150A. In one embodiment, storage medium 134 is memory within computer system 100A. In another embodiment, storage medium 134 is coupled to computer system 100A via a network connection. Storage medium 134 may be physically located within the same physical device as processor unit 132. Storage medium 134 may be a memory that is dedicated to processor unit 132 or may be shared by other devices.

Storage medium 134 may be implemented using various types of non-volatile memory. In various embodiments, storage medium 134 is a dedicated or a shared non-volatile memory, which can be any kind of a rotational (i.e., magnetic/optical drive) or a solid-state storage (i.e. flash memory) medium. In some embodiments, storage medium 134 is a removable memory/storage component (e.g. a flash memory disk). In one embodiment, storage medium 134 is a read-only memory.

The boot controller 122 also includes storage medium 136, which is representative of memory used by processor unit 132 during execution of code stored in storage medium 134. In one embodiment, storage medium 136 is volatile memory such as random access memory. Storage medium 136 may be located internal or external to computer system 100A. In some embodiments, storage medium 136 is implemented in SAN 190. Storage medium can also be a stand-alone storage component/system. Storage medium 136 may also be in a physically removable form, such as an ejectable, writable DVD or a flash memory disk.

Figure 2:
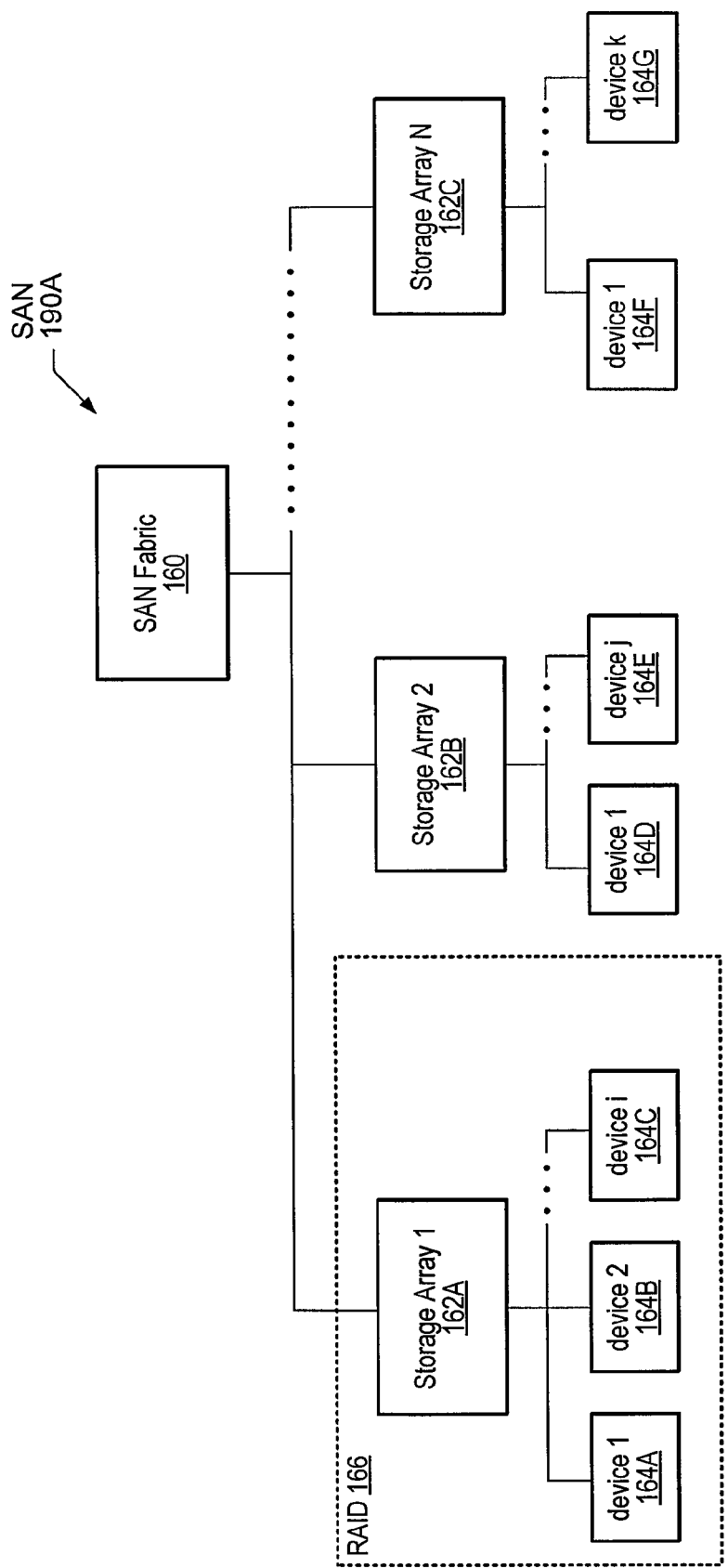
FIG. 2 is a block diagram of one embodiment of storage area network (SAN) system.

Referring to FIG. 2, a block diagram of one embodiment of a SAN (indicated by reference numeral 190A) is illustrated. As shown, SAN 190A includes SAN fabric 160, which provides not only an external connection for SAN 190A (e.g., to bus interface 121), but also the various interconnects and switching components that provide access to storage arrays 162. In one embodiment, SAN Fabric 160 is compatible with a Fibre Channel architecture. In the embodiment shown in FIG. 2, SAN Fabric 160 is connected to one or more storage arrays (shown as 162A-C) which, in turn, may each include one or more storage devices (shown as 164A-G). SAN Fabric 160 provides the physical infrastructure for accessing one or more logical volumes found on storage arrays 162, wherein the physical storage associated with each logical volume may be distributed across different storage devices 164. It is noted that in various embodiments, various combinations of the elements illustrated in FIG. 2 are possible to create a desired SAN configuration.

SAN 190A includes N storage arrays (represented by reference numerals 162A-C), indicating that SAN 190A includes an arbitrary number of storage arrays. Furthermore, storage arrays 162 can each include an arbitrary number of storage devices 164. For example, storage array 162A includes i devices shown by reference numerals 164A-C; storage array 162B includes j devices shown by 164D-E, while storage array 162C includes k storage devices shown by 164F-G (where i, j, and k can each be different, arbitrary integers).

Figure 3:
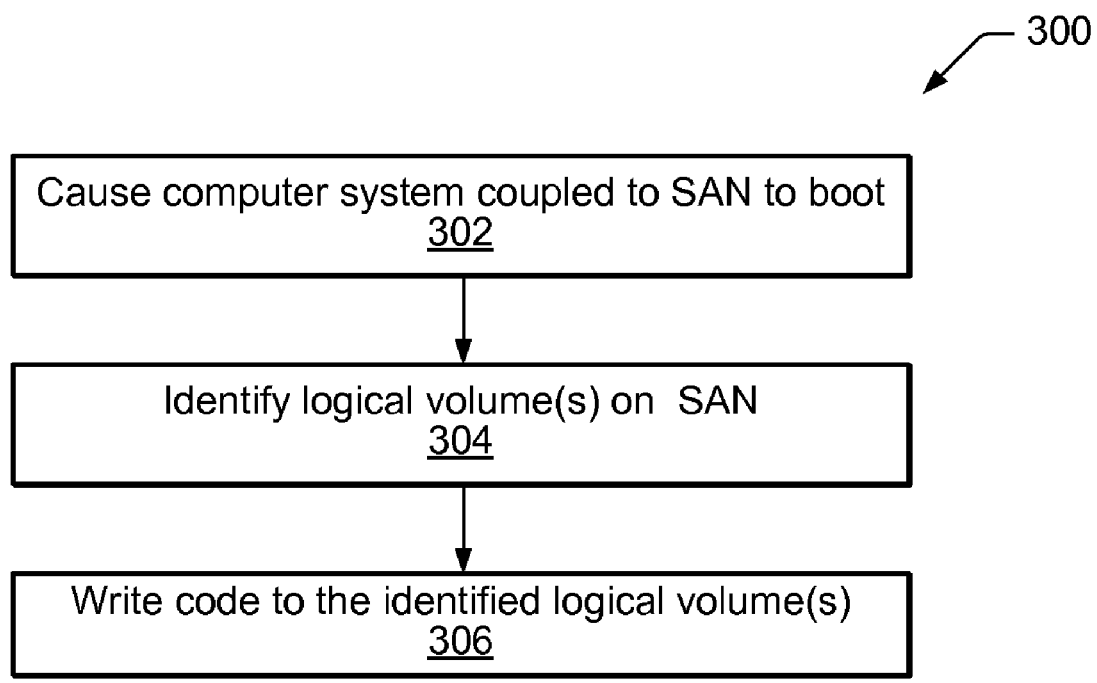
FIG. 3 illustrates one embodiment of a method for detecting logical volumes.

Referring now to FIG. 3, a method 300 for managing logical volumes on a SAN is illustrated. For ease of reference, method 300 is described relative to system 150A shown in FIG. 1. It is noted that method 300 may be performed by boot controller 122.

In step 302, computer system 100A coupled to SAN 190A is caused to initiate booting (i.e., starting up). In step 304, one or more logical volumes on SAN 190A are identified, subsequently referred to as "identified logical volumes." The identification in step 304 may include accessing the one or more identified logical volumes for reading and writing. In step 306, code is written to the identified logical volumes. As described below, the code written to the identified logical volumes is usable to determine "configuration information" of the identified logical volumes and perform additional management functions. In some embodiments, the configuration information for an identified logical volume includes partition information, such as a partition table or a master boot record. The configuration information may be indicative of a particular type of file system loaded on an identified logical volume. The configuration information may further indicate whether or not an identified logical volume is configured as a bootable logical volume. The configuration information may further indicate which operating system has been configured for loading on a bootable logical volume. In some embodiments, the configuration information includes specific memory/storage addresses on a bootable logical volume, which are accessed upon booting from that logical volume. The configuration information for a bootable logical volume may also be specific to a given type of operating system, or may include an indication of the type of operating system.

Figure 4:
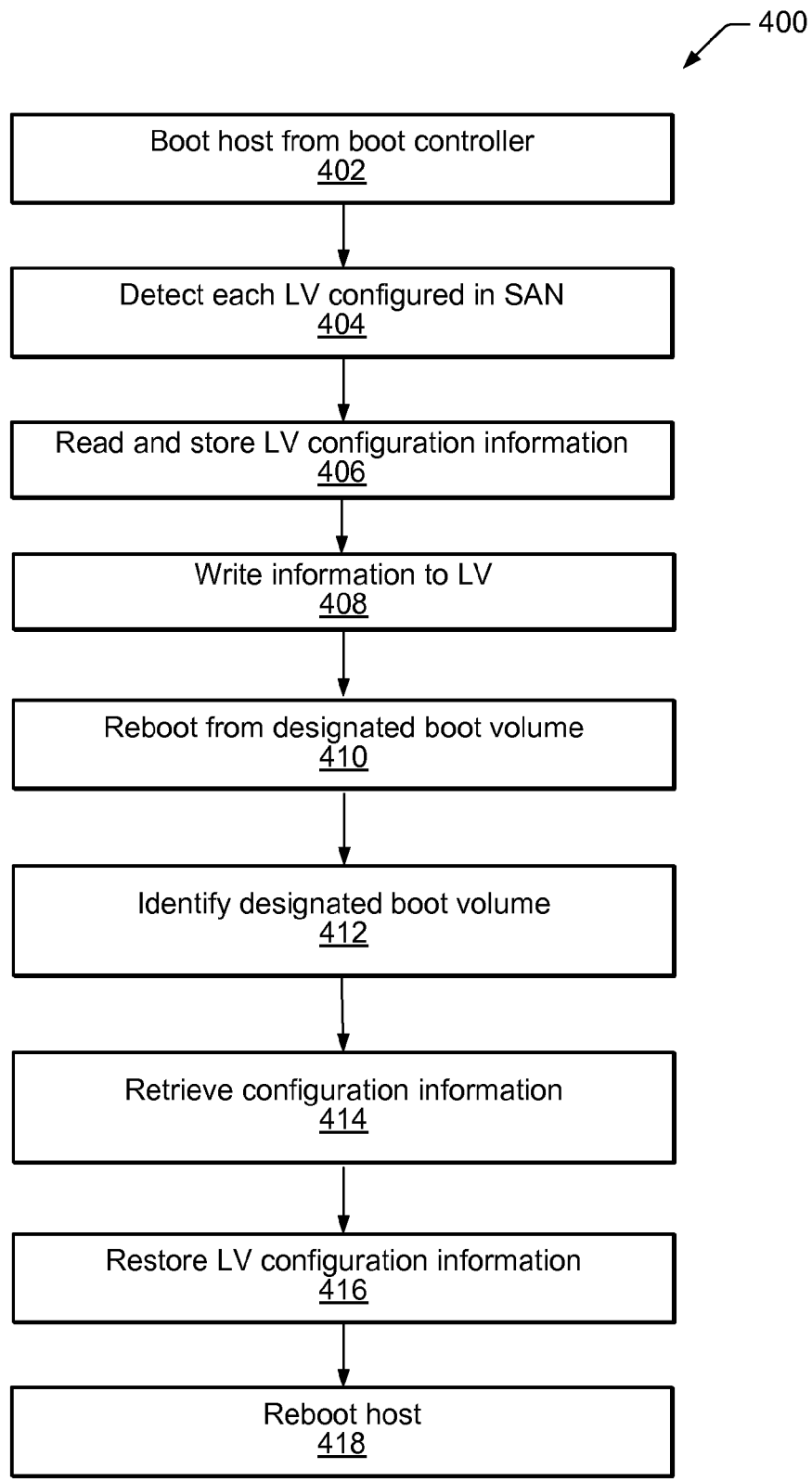
FIG. 4 illustrates one embodiment of a method for detecting logical volumes.

In reference to FIG. 4, a method 400 for detecting and analyzing logical volumes on a SAN is illustrated. As with method 300, method 400 is described with reference to representative system 150A shown in FIG. 1. It is noted that method 400 is hardware-independent in a manner similar to method 300. In method 400, computer system 100A is configured for boot-from-SAN using a designated boot volume (i.e., a logical volume) configured on SAN 190, which is accessed by computer system 100A using bus interface 121.

As noted above, method 400 may be performed on computer system 100A, which is configured for boot-from-SAN operation. However, in some instances, method 400 may be initiated, either accidentally or purposefully, on certain configurations of computer system 100A that are not boot-from-SAN. For example, the computer system 100A could be configured to boot from a volume on a local fixed disk, even though access to a SAN (or to bootable SAN logical volumes) is available. Thus, method 400 may optionally include various additional conditional steps (not shown in FIG. 4) for determining if the method should proceed (or can safely proceed), or should be terminated. For example, if the designated boot volume is detected to be a local hard disk, then method 400 may be forced to terminate prior to step 402. In some embodiments, method 400 may treat a local hard disk in the same manner as a SAN logical volume. In some embodiments, method 400 proceeds if the designated boot volume is detected among one of the identified logical volumes. In various embodiments, method 400 may terminate at intermediate steps and restore the previous state of computer system 100A as soon as configuration inconsistencies or hardware errors are detected. In some embodiments, a user interface is employed to enable a user to determine, based on information detected from computer system 100A displayed to said user, whether method 400 proceeds or not.

In step 402, the computer system is booted using code supplied by boot controller 122. The boot controller obtains control of the computer system by causing the computer system to boot from a particular resource associated with boot controller 122. For example, a manual reconfiguration of the BIOS of computer system 100A may cause boot controller 122 to become the boot target drive. The boot controller 122 may also receive a request for booting the computer system 100A and respond by loading executable program instructions (i.e. "boot code") on the computer system. The boot code can be stored in advance on storage medium 134. In some embodiments, the boot code is configured to load an operating system and further load and execute additional program instructions—for example, executing at least some of the method steps 404-418. In other embodiments, the boot code is provided by an external source that is controlled by a boot controller 122. Thus, after completion of step 402, boot controller 122 has caused computer system 100A to start up under control of boot code associated with boot controller 122. The boot code is configured to initiate execution of at least some of the method steps 404-418.

In step 404, the logical volumes configured on the SAN 190 are detected. In various embodiments, the method relies on an operating system-dependent device driver installed on computer system 100A for detecting and communicating with SAN logical volumes. The device drivers provide support for bus interface 121 for an operating system executing on computer system 100A. Even though some embodiments of step 404 are operating system specific, embodiments of the method remain independent of a particular embodiment of bus interface 121 where a common set of functions of bus interface 121 is standardized by the device class specification of the operating system. In addition to being operating system specific, the device driver is also adapted to the interfaces provided on bus interface 121. In some embodiments, a generic bus interface device driver, with a certain set of common functions for various kinds of bus interfaces 121, may be loaded with the boot code in step 402. Some examples of common functions include a query of a device ID or of the device class; a block read; and a block write.

Through the device driver architecture, the operating system thus provides an interface by which the device ID (or device address) and the device class can be identified for any devices present. It is noted that a "device" may include a physical or a logical entity as viewed by the OS. For example, under the Linux OS, a device class can be "HD" or "SD", respectively corresponding to a "local harddisk" or a so-called "SCSI-disk". The latter device class, SD, may be used to designate various kinds of logical or physical device interfaces (not just the physical SCSI interface).

In one embodiment, a logical unit number (LUN) for each logical volume presently configured on computer system 100A is identified in step 404. A "LUN" is a type of device ID for a SAN volume. In some embodiments, detection of available LUNs in step 404 includes communication between a device driver and a BIOS of bus interface 121, wherein the BIOS stores information about SAN 190. The LUN for a logical volume may also be associated with additional addressing information, such as interface, channel, and device information for that logical volume. Using a LUN (or an associated address), read/write commands may be issued to a logical volume and data may be written to or read from the logical volume. In some embodiments, the execution of a read/write command, or a combination thereof, is used to verify that a detected logical volume is actually present and accessible. The one or more logical volumes detected (and optionally verified) in step 404 are referred to herein as "identified logical volumes." In contrast, other logical volumes, which may be logically configured but yet remain unavailable for reading/writing on SAN 190, are not included when referring to the "identified logical volumes."

In step 406, configuration information (as described above with respect to FIG. 3) is read by boot controller 122 from one or more of the identified logical volumes. The configuration information can be read by directly (i.e., logically) reading the storage blocks of the logical volume. In some embodiments, a combination of reading and analyzing (using various algorithms) may be repeated in step 406 to determine the specific configuration of the logical volume, and hence the location and extent of the desired configuration information. The configuration information may depend on various factors, such as volume size, file system, boot system, SAN interface, etc. As will be described below, analysis of the identified logical volumes is performed in method 400 using this configuration information.

After the configuration information for one or more of the identified logical volumes is read, step 406 may further include storing the configuration information along with a unique signature (such as a LUN or an other type of index) for each logical volume. (Other alternatives to a unique signature, e.g., a counter value that is incremented upon booting, are possible.) In some embodiments, this information is stored on storage medium 136 or other memory that is accessible to boot controller 122. In this manner, the configuration information for one or more identified logical volumes, including bootable logical volumes, may subsequently be retrieved using the unique signature (or other value) for that logical volume.

In step 408, information is written to one or more of the identified logical volumes. In one embodiment, this information includes executable code that is written to a memory of each of the identified logical volumes, along with a value or "signature" that is unique relative to the signature of the other volumes that are written to. At least some of the configuration information present on the identified logical volumes prior to the execution of method 400 may be overwritten by this process. However, the configuration information stored in step 406 may include information overwritten in step 408, such that the overwritten information may be restored.

In one embodiment, the executable code may include boot code and may be written to a master boot record (or similar partition table structure) on the identified logical volumes. A master boot record "MBR," in one embodiment, is a predetermined sector (e.g., the first sector) of a physical storage volume (or a logical volume) that may be used for special purposes, such as storing a partition table or boot code. A typical MBR is a 512-byte boot sector of a disk partitioned for IBM PC-compatible computer interfaces, and begins at sector zero. Another MBR is the QUID Partition Table "GPT" which is part of the Extensible Firmware Interface "EFI" standard proposed by Intel Corp.

It is noted that some embodiments of method steps 402-408 have not identified which, if any, logical volume is the designated boot volume on the computer system. This information is not included in the configuration information for an identified logical volume. It is noted that, in some embodiments, method steps 402-408 interact with identified boot volumes regardless of their boot configuration or designation as a boot volume.

It is further noted that the designation of the boot volume on the computer system is wholly independent from the internal configuration of a logical volume, e.g. whether or not a designated boot volume is actually bootable. This independence arises because the designation of a boot volume is an internal attribute of computer system 100A, whereas bootability is an internal condition related to the contents loaded on a logical volume. Thus, in various embodiments, a designated boot volume is not bootable, while in other instances, some bootable logical volumes are not designated as boot volumes.

In step 410, the computer system is rebooted from its designated boot volume—for example, using a reboot command. In response to a reboot command, executable code written to the logical volume that is the designated boot volume in step 408 is loaded on the computer system in step 410. The loading (i.e. reading) may occur by different methods in various embodiments. For example, the configuration information of the designated boot volume may cause the executable code written in step 408 to be loaded. In some embodiments, the boot controller 122 may intervene in the boot process and cause code stored on the designated boot volume to be loaded. After the code is loaded, it is executed upon booting in step 410.

In step 412, the designated boot volume is identified. In one embodiment of step 412, the signature written in step 402 is used to index the designated boot volume among the identified logical volumes, using the configuration information stored in step 406. Thus, code that has been written to the designated boot volume may execute, causing the signature or other value that has been written to the designated boot volume to be determined. This value read can then be used, for example, to read from a memory location (e.g., a table or other data structure) that includes information mapping a signature to an identification of a boot volume. In this manner, the code that has been loaded from the designated boot volume may be used to determine the identity of the designated boot volume. Many other embodiments of step 412 are possible.

For example, in some embodiments of step 412, storage medium 136 may store counter values for each of the identified logical volumes. Execution of boot code that has been loaded from the designated boot volume may first read counter values for each logical volume (e.g., stored at some memory location that includes a plurality of values, each of which corresponds to a logical volume). The counter value for the volume that has booted may then be incremented. By subsequently scanning the counter values for each logical volume, the designated boot volume may be determined by identifying the counter value that has been incremented.

In step 414, configuration information for one or more identified logical volumes, including the designated boot volumes, is retrieved. In one embodiment of step 414, the signature written to the one or more identified logical volumes is used to retrieve configuration information. In some embodiments, the signature is used to retrieve configuration information from storage medium 136 for a corresponding identified logical volume. In particular, the configuration information for the designated boot volume may be retrieved using the signature. In some embodiments of step 414, configuration information for the designated boot volume is retrieved based on a counter that is incremented each time computer system 100A is booted from the designated boot volume. As mentioned previously, the configuration information may include boot records of a partition table. In some embodiments, configuration information for each of the identified logical volumes is retrieved for the purpose of restoring each identified logical volume to its original state prior to execution of method 400.

In step 416, the configuration information is written to the one or more identified logical volumes. It is noted that step 416 is optional and, in certain embodiments, is executed only if it is necessary to restore the original state of the identified logical volumes. In various embodiments, the data written to the identified logical volumes in step 408 is overwritten with its original contents, which were stored as configuration information in step 406.

It is noted that in some embodiments, the internal configuration of each identified logical volume may additionally be determined in either step 414 or 416 by analyzing its configuration information, if this has not already been established in a prior method step. In particular, it may be determined whether an identified logical volume is configured as a bootable logical volume, and which operating system is loaded for booting.

In step 418, the computer system is again rebooted. Since the designated boot volume, along with the other identified logical volumes, has been restored to its state prior to execution of method 400, the computer system may reboot "normally," without any further action from boot controller 122.

Figure 5:
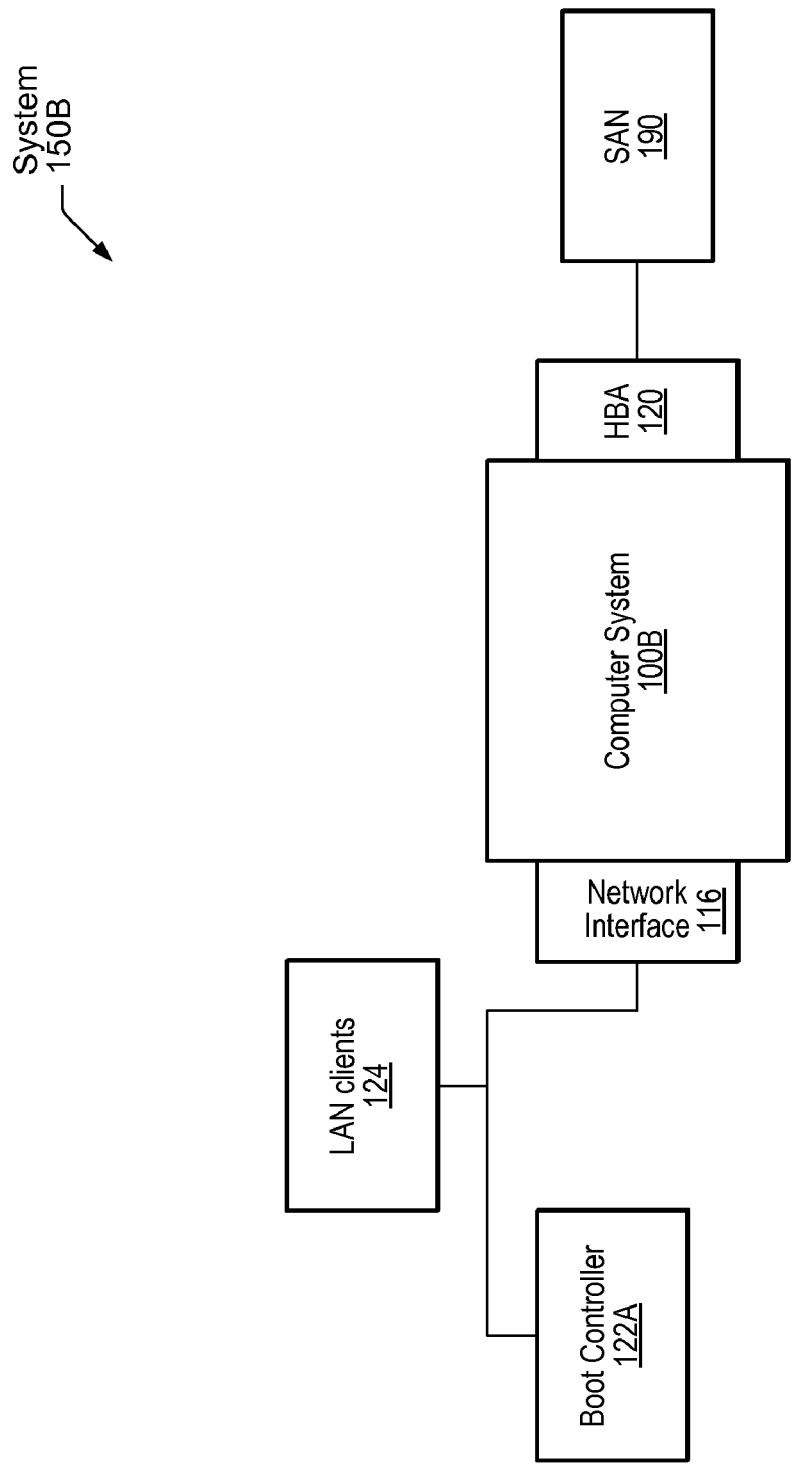
FIG. 5 is a block diagram of one embodiment of a computer system.

Turning now to FIG. 5, a block diagram of system 150B is illustrated. Elements corresponding to prior figures are numbered identically. In FIG. 5, computer system 100B represents an embodiment of computer system 100A and is a SAN host that includes network interface 116. The network interface 116 is used by LAN clients 124, representing a plurality of client systems, for accessing the logical volumes configured on the SAN system 150B. In various embodiments, network interface 116 also provides communication for an external boot controller 122A. In one embodiment, boot controller 122A is a computer system that provides various network services, such as a response to a network boot request, via network interface 116. It is further noted that HBA 120 represents one or more host bus adapters, for interfacing an internal bus system of computer system 100B to SAN Fabric 160 via an external SAN interface, such as Fibre Channel or other interface.

Figure 6:
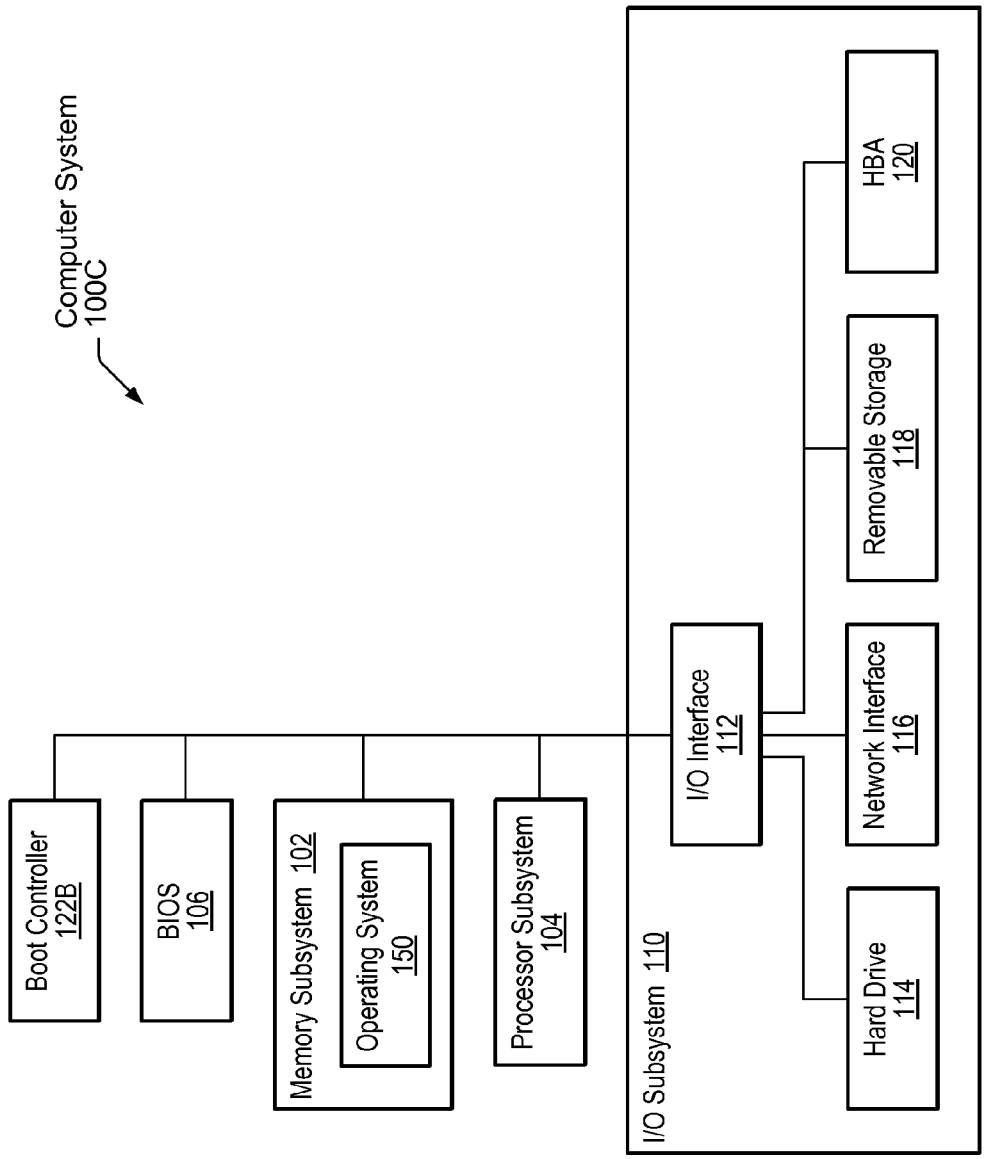
FIG. 6 is a block diagram of one embodiment of a computer system.

Turning now to FIG. 6, a block diagram of one embodiment of a computer system 100C is illustrated. Computer system 100C, which represents an embodiment of computer system 100A, includes a processor subsystem 104 coupled to a memory subsystem 102. Processor subsystem 104 and memory subsystem 102 are in turn connected to an I/O subsystem 110, which comprises an I/O interface 112, a hard disk drive 114, a network interface 116, and a removable storage 118. The I/O subsystem 110 may further include one or more host bus adapters (HBAs), represented by HBA 120. Computer system 100C may be representative of a laptop, desktop, server, workstation, terminal, personal digital assistant (PDA) or any other type of computer system in various embodiments.

Processor subsystem 104 is representative of any of various types of processors such as an x86 processor, a PowerPC processor, a SPARC processor, etc. In some embodiments, processor subsystem 104 includes one or more individual processor units, which may be found within a single physical computer system or distributed across multiple computer systems. Similarly, memory subsystem 102 may include any of various types of memory, including DRAM, SRAM, EDO RAM, Rambus RAM, etc. The memory within subsystem 102 may be located within a single physical device or may be distributed across multiple devices (e.g., a storage array).

I/O interface 112 is operational to transfer data between processor subsystem 104 and/or memory subsystem 102 and one or more internal or external components such as hard disk drive 114, network interface 116, removable storage 118, and HBA 120, as desired. For example, I/O interface 112 may embody a PCI bridge operable to transfer data from processor subsystem 104 and/or memory subsystem 102 to one or more PCI devices. I/O interface 112 may additionally or alternatively provide an interface to devices of other types, such as SCSI, iSCSI, SAS, SATA, USB, Firewire (IEEE-1394), and/or Fibre Channel devices via HBA 120.

Hard disk drive 114 may be a non-volatile memory such as a magnetic media. Network interface 116 may be any type of network adapter, such as Ethernet, fiber optic, or coaxial adapters. Removable storage 118 is representative of a disk drive, optical media drive, tape drive, flash memory drive, or other type of storage media, as desired.

Computer system 100C may further include a BIOS 106, which represents a type of ROM including firmware for initiating boot-up and peripheral hardware configuration. Computer system 100C also includes an embedded version of boot controller 122B, which can access I/O subsystem 110, BIOS 106, memory subsystem 102, or processor subsystem 104, as desired.

In addition to the depicted hardware components, computer system 100C may additionally include various software components. In various embodiments, BIOS 106 and boot controller 122B include firmware (i.e., program code) for executing program instructions on processor subsystem 104. For example, FIG. 6 illustrates an operating system 150 stored in memory subsystem 102. Operating system 150 is representative of any of a variety of specific operating systems, such as, for example, Microsoft Windows, Linux, or Sun Solaris. As such, operating system 150 may be operable to provide various services to the end user and provide a software framework operable to support the execution of various programs. It is noted that the depicted software components of FIG. 6 may be paged in and out of memory subsystem 102 in a conventional manner from a storage medium such as hard drive 114.

Figure 7:
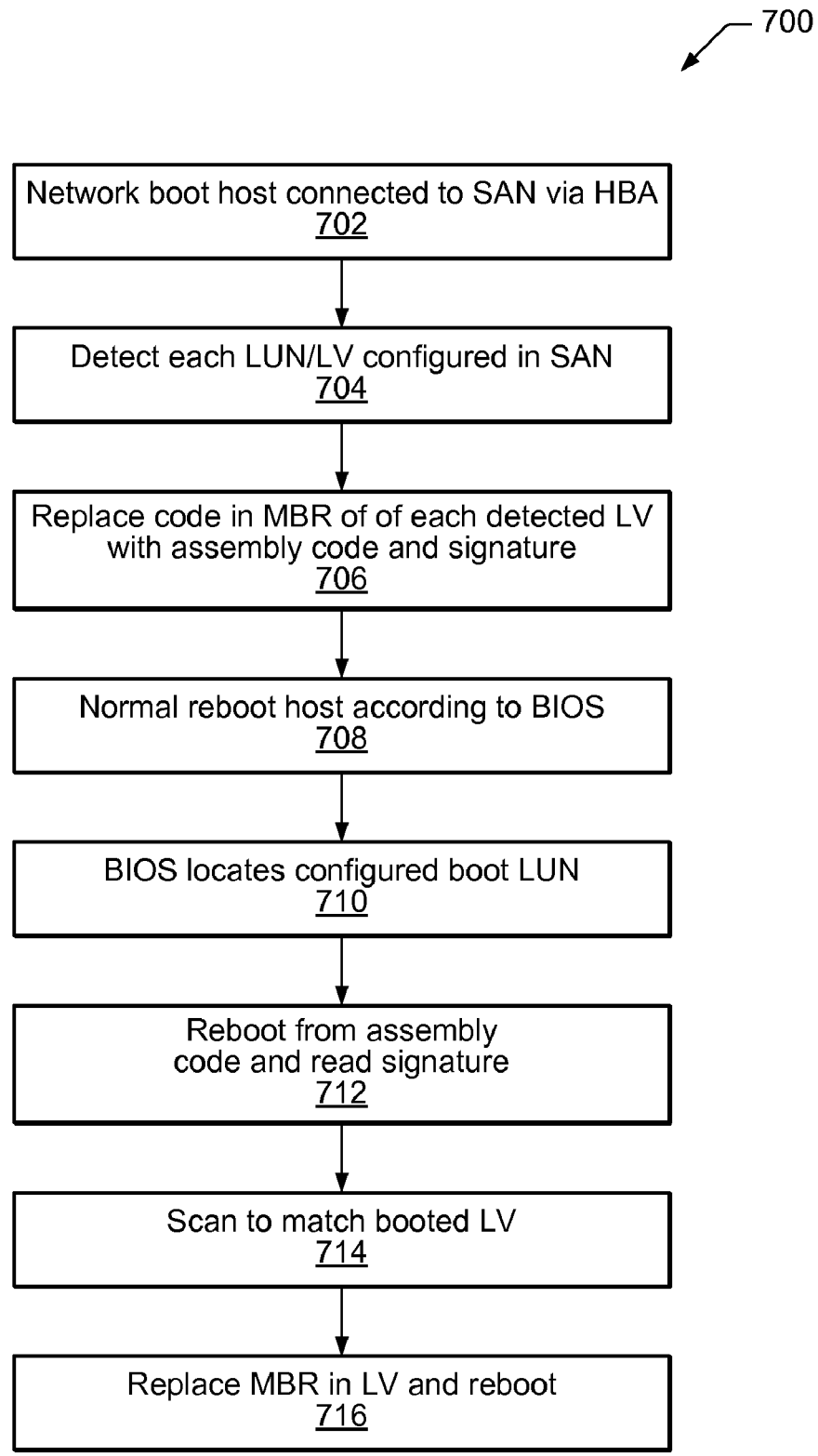
FIG. 7 illustrates one embodiment of a method for detecting logical volumes.

Referring now to FIG. 7, a method 700 for managing logical volumes on a SAN is illustrated. In particular, method 700 can be used to identify a designated boot volume in a boot-from-SAN architecture. In various embodiments, the method 700 is executed on the representative system 150B shown in FIG. 5, in which computer system 100B is connected to SAN 190 via HBA 120. It is noted that method 700 is hardware-independent in a manner similar to method 400. In method 700, boot controller 122A is implemented as a network server with various functionalities, as will be now described in detail.

In step 702, computer system 100B is configured for network booting. This may be accomplished by designating a network boot protocol in the firmware controlling boot operations of computer system 100B. For example, in the BIOS of computer system 100B, the boot setting may be set to NetBIOS as the primary boot device. The computer system 100B is then (re)booted. Boot controller 122A is configured to respond to network requests for boot services and so causes computer system 100B to boot. Boot controller 122A also provides the executable boot code from storage medium 134 for computer system 100B in step 702. For example, boot controller 122A may load an operating system and executable code on computer system 100B, for executing the remaining steps in method 702. In one embodiment, boot controller 122A provides an embedded LINUX operating system core with features for executing additional steps in method 700, such as one or more device drivers for HBA 120. Thus, step 702 completes with code provided by boot controller 122 executing on computer system 100B.

In step 704, each logical volume configured in the SAN 190 on HBA 120 is identified by its LUN. In other words, each LUN configured on SAN 190 is detected. The LUN is used for accessing (i.e. addressing) the corresponding logical volume. In step 704, the actual presence and operation of the logical volume may be tested (i.e. verified) by reading and writing data using the LUN. The logical volumes detected (and optionally verified) in step 704 are referred to herein as "identified logical volumes." In step 704, the master boot record and/or a portion of the volume partition table, collectively referred to as the "MBR," for each identified logical volume is stored on storage medium 136, along with a unique signature and other information for that volume. This stored information represents configuration information for each identified logical volume.

In step 706, the MBR on each identified logical volume is replaced with additional executable code and the signature for that volume. The executable code can be assembly code specific to computer system 100B.

In step 708, the internal boot configuration of computer system 100B is restored to its original state (prior to step 702), and computer system 100B is caused to reboot. In step 710, the BIOS firmware of computer system 100B is reset to boot from HBA 120 as the boot device. In this manner, boot control is passed to HBA 120 from the BIOS during startup. The HBA 120 then uses its own internal firmware to select a designated boot volume (based on a LUN), which is one of the identified logical volumes. This represents a boot-from-SAN implementation for computer system 100B.

In step 712, the code loaded on the designated boot volume (in step 706) is loaded and boots computer system 100B. In one embodiment of step 714, the signatures for all the identified logical volumes are scanned and are used to match (and thereby identify) the designated boot volume from the configuration information stored in step 704. In some embodiments of step 714, a counter is incremented each time computer system 100A boots from a given identified logical volume, and the counter values are used to identify the designated boot volume. It is noted that in step 714, further analysis of the configuration information can provide additional information about the internal state of the identified logical volumes. For example, it may be determined which file system is installed, if a volume is bootable, and if so, which operating system is loaded for booting.

In step 716, the MBR for all the identified logical volumes is restored, and computer system is caused to reboot from its original state, prior to execution of method 700.

Thus, the methods described herein provide a means for detecting and analyzing logical volumes in a computer system. In some embodiments, functions for managing logical volumes in boot-from-SAN implementations are provided. Yet, in various embodiments, the methods and systems described herein can be used in numerous applications related to the analysis and use of configuration information for logical volumes.

For example, one embodiment, wherein the functionality is implemented in embedded firmware of a computer system, provides the ability to automatically detect if a selected boot device is actually capable (i.e. internally configured) of booting, and which operating system is loaded. The boot device could be a local or a remote storage device, or a type of network storage system (SAN, Network Area Storage NAS, etc.). Such functionality is implemented in the BIOS of a computer system in one embodiment. In another embodiment, corresponding functionality is implemented for an Extensible Firmware Interface (EFI by Intel Corp.) of a computer system. For example, the BIOS or EFI of a computer system executing the methods described herein may thus include real-time functionality for validating boot settings while they are being entered by a user. In other embodiments, the firmware (i.e., BIOS or EFI) is implemented in a removable flash drive that can be used on different computer systems for diagnostic purposes.

Various other uses, based on the analyses and methods using configuration information as described herein, include detection/remediation of corrupted boot records and/or partition tables, detection of malicious code, and validation of licenses of installed boot programs. Still further uses involve network access to configuration information for one or more computer systems, such as central management/validation/testing/remediation of boot configurations for a plurality of client systems.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium storing program instructions that are computer-executable to:
   identify one or more logical volumes within a storage area network (SAN) coupled to a computer system having a designated boot volume;
   write a different respective signature to each of the identified logical volumes; and
   write code to the identified logical volumes;
   wherein said program instructions on said computer-readable medium and said code written to the identified logical volumes are executable upon a re-boot of the computer system to determine an identity of the designated boot volume by identifying the respective signature written to that volume.

2. The non-transitory computer-readable memory medium of claim 1, wherein said program instructions on said computer-readable medium and said code written to said identified logical volumes are executable to determine configuration information stored on said identified logical volumes.

3. The non-transitory computer-readable memory medium of claim 2, wherein said configuration information for a first of the identified logical volumes includes partition information relating to partitioning of the first logical volume.

4. The non-transitory computer-readable memory medium of claim 3, wherein the partition information for the first logical volume includes data stored in the master boot record of the first logical volume.

5. The non-transitory computer-readable memory medium of claim 3, wherein the partition information for the first logical volume includes at least a portion of a partition table stored on the first logical volume.

6. The non-transitory computer-readable memory medium of claim 2, wherein said configuration information for each of said identified logical volumes indicates whether that logical volume is a bootable logical volume.

7. The non-transitory computer-readable memory medium of claim 6, wherein said configuration information indicates that a first of the identified logical volumes is a bootable logical volume, and wherein said configuration information for said first logical volume further indicates a type of operating system to be loaded upon booting from said first logical volume.

8. The non-transitory computer-readable memory medium of claim 1, wherein said program instructions are further executable to:
   store information indicative of the signatures written to the identified logical volumes.

9. The non-transitory computer-readable memory medium of claim 8, wherein, prior to writing code to the identified logical volumes, said program instructions are further executable to:
   read configuration information from each of said identified logical volumes; and
   store the configuration information read from each of said identified logical volumes.

10. The non-transitory computer-readable memory medium of claim 9, wherein said program instructions are further executable to:
    cause said computer system to re-boot; and
    upon re-boot of the computer system, compare the signature stored on the designated boot volume with the stored information indicative of the signature for each of the identified logical volumes to determine the identity of the designated boot volume.

11. The non-transitory computer-readable memory medium of claim 10, wherein said code written to the designated boot volume is further executable to:
    retrieve the stored configuration information for the designated boot volume using the signature written to the designated boot volume; and
    write at least a portion of the retrieved configuration information to the designated boot volume.

12. The non-transitory computer-readable memory medium of claim 9, wherein said program instructions are further executable to:
    determine, from the configuration information read from each of the identified logical volumes, which of the identified logical volumes is configured as a bootable logical volume; and
    display a list of the bootable logical volumes.

13. The non-transitory computer-readable memory medium of claim 12, wherein said program instructions are further executable to:
    allow selection of one of the displayed bootable logical volumes; and
    cause said computer to re-boot from the selected bootable logical volume.

14. The non-transitory computer-readable memory medium of claim 13, wherein said program instructions are further executable to:
    configure said computer system to boot from the selected bootable logical volume.

15. A computer system, comprising:
    a processor subsystem; and
    a memory storing program instructions executable by said processor subsystem to:
    identify one or more logical volumes within a storage area network (SAN) coupled to the computer system having a designated boot volume;
    write a different respective signature to each of the identified logical volumes; and
    write code to the identified logical volumes;
    wherein said program instructions and said code written to the identified logical volumes are executable upon a re-boot of the computer system to determine an identity of the designated boot volume by identifying the respective signature written to that volume.

16. The computer system of claim 15, wherein, prior to writing code to the identified logical volumes, said program instructions are further executable to:
   read configuration information from each of the identified logical volumes; and
   store the configuration information read from each of the identified logical volumes; and
wherein said program instructions are further executable to:
   store information indicative of the signatures written to the identified logical volumes.

17. The computer system of claim 16, wherein said program instructions are further executable to:
   cause said computer system to re-boot; and
   upon re-boot of the computer system, compare the signature stored on the designated boot volume with the stored information indicative of the signature for each of the identified logical volumes to determine the identity of the designated boot volume.

18. A computer-implemented method, comprising:
   identifying one or more logical volumes within a storage area network (SAN) coupled to a computer system having a designated boot volume;
   writing a different respective signature to each of the identified logical volumes; and
   writing code to the identified logical volumes;
   wherein said code written to the identified logical volumes is executable upon a re-boot of the computer system to determine an identity of the designated boot volume by identifying the respective signature written to that volume.

19. The method of claim 18, further comprising:
   prior to writing code to the identified logical volumes, reading configuration information from each of the identified logical volumes; and
   storing the configuration information read from each of the identified logical volumes; and
wherein writing code to the identified logical volumes further comprises:
   storing information indicative of the signatures written to the identified logical volumes.

20. The method of claim 19, further comprising:
   causing said computer system to re-boot, and
   upon re-boot of the computer system, comparing the signature stored on the designated boot volume with the stored information indicative of the signature for each of the identified logical volumes to determine the identity of the designated boot volume.

* * * * *